United States Patent
Choi et al.

(10) Patent No.: US 8,802,050 B2
(45) Date of Patent: Aug. 12, 2014

(54) METHOD OF MANUFACTURING CERAMIC POWDER HAVING PEROVSKITE STRUCTURE AND CERAMIC POWDER HAVING PEROVSKITE STRUCTURE MANUFACTURED USING THE SAME

(75) Inventors: Chang Hak Choi, Gyunggi-do (KR); Kum Jin Park, Gyunggi-do (KR); Kang Heon Hur, Gyunggi-do (KR); Hye Young Baeg, Gyunggi-do (KR); Jung Hwan Kim, Gyunggi-do (KR); Hyung Joon Jeon, Gyunggi-do (KR); Sang Hoon Kwon, Gyunggi-do (KR)

(73) Assignee: Samsung Electro-Mechanics Co., Ltd., Suwon-Si, Gyeonggi-Do (KR)

( * ) Notice: Subject to any disclaimer, the term of this patent is extended or adjusted under 35 U.S.C. 154(b) by 231 days.

(21) Appl. No.: 13/411,037

(22) Filed: Mar. 2, 2012

(65) Prior Publication Data
US 2012/0225292 A1    Sep. 6, 2012

(30) Foreign Application Priority Data
Mar. 2, 2011    (KR) .................. 10-2011-0018542

(51) Int. Cl.
*C01G 23/00*    (2006.01)

(52) U.S. Cl.
USPC ................. 423/598; 423/594.12; 423/263

(58) Field of Classification Search
None
See application file for complete search history.

(56) References Cited

FOREIGN PATENT DOCUMENTS

| JP | 2003-261329 | | 9/2003 |
|---|---|---|---|
| JP | 2005-289668 | | 10/2005 |
| JP | 2010-083708 | * | 4/2010 |
| KR | 10-2003-0031649 A | | 4/2003 |
| KR | 10-2006-0028892 A | | 4/2006 |

OTHER PUBLICATIONS

Translation of CN 101671180A, Mar. 17, 2010, Xibin Song, et al.*
Translation of KR 100428496B1, Apr. 28, 2004, Park et al.*
Translation of JP 2010083708A, Apr. 15, 2010, Huang, et al.*
Translation of JP 2003261329A, Sep. 16, 2003, Hakuta, et al.*

* cited by examiner

*Primary Examiner* — Steven Bos
(74) *Attorney, Agent, or Firm* — McDermott Will & Emery LLP

(57) ABSTRACT

There are provided a method of manufacturing a ceramic powder having a perovskite structure and a ceramic powder having a perovskite structure manufactured by the same. The method includes: mixing a compound of an element corresponding to site A in an $ABO_3$ perovskite structure as well as a compound of an element corresponding to site B in the same structure, with supercritical water in a continuous mode to form seed crystals; and mixing the seed crystals in a batch mode to conduct grain growth thereof.

12 Claims, 4 Drawing Sheets

METHOD OF MANUFACTURING CERAMIC POWDER HAVING PEROVSKITE STRUCTURE AND CERAMIC POWDER HAVING PEROVSKITE STRUCTURE MANUFACTURED USING THE SAME

CROSS-REFERENCE TO RELATED APPLICATIONS

This application claims the priority of Korean Patent Application No. 10-2011-0018542 filed on Mar. 2, 2011, in the Korean Intellectual Property Office, the disclosure of which is incorporated herein by reference.

BACKGROUND OF THE INVENTION

1. Field of the Invention

The present invention relates to a method of manufacturing a ceramic powder having a perovskite structure and a ceramic powder having a perovskite structure manufactured by the same and, more particularly, to a method of manufacturing a ceramic powder having a perovskite structure with excellent crystallinity and a small average particle diameter and a ceramic powder having a perovskite structure manufactured by the same.

2. Description of the Related Art

Since electrical and electronic equipment industries have recently tended to pursue high performance devices having small, light weight bodies (or devices reduced in weight, thickness, length and size), electronic components are required to have a small size, high performance and low price. Specifically, with the progress of high speed CPUs and reduction in the weight and size, as well as the digitalization and high functionalization of electronic equipment, research and investigation into an embodiment of a multilayer ceramic capacitor (hereinafter, 'MLCC') having specific characteristics such as decreased size and thickness, high capacitance, and low impedance in the range of high frequencies have also been actively conducted.

Perovskite powder used as a dielectric layer of an MLCC is mostly prepared by a solid phase method, co-precipitation, or the like. However, such methods require a calcination process at a high temperature and a grinding (pulverization) process, since a crystalline phase is formed during high temperature calcination, and may have the disadvantage of non-uniform particle size.

In recent years, in order to provide high capacity and a reduction of a size of an MLCC, a decrease in a thickness of a dielectric layer for constructing the MLCC has been required. However, in a case in which the dielectric layer has a reduced thickness, a surface roughness of the dielectric layer is increased and a ratio of short circuits is also increased when the perovskite powder has a relatively large particle size, causing insulation resistance failure.

Accordingly, extensive studies into the synthesis of powder using hydrothermal synthesis or hydrolysis of metal alkoxide to produce perovskite powder having excellent characteristics have been conducted.

Although the hydrothermal synthesis has the merit of enabling direct production of crystalline barium titanate in a spherical form, it entails problems such as difficulties in the designing and management of a reaction pipe and high production costs. Moreover, it has recently been reported that some defects such as oxygen vacancy and/or barium vacancy are present in barium titanate particles prepared by hydrothermal synthesis and may be enlarged to form pores during heat treatment, deteriorating dielectric properties.

Meanwhile, barium titanate synthesis using the hydrolysis of metal alkoxide has advantages such as higher reactivity than hydrothermal synthesis owing to use of a starting material in a liquid state, the possibility of synthesis at a relatively low temperature, or the like. However, in the case in which an alkoxide reagent is used as a starting material, the material is expensive. Also, since an alcohol solvent is used, processing conditions such as a synthesis temperature are relatively complicated, causing restrictions in the mass-production thereof.

SUMMARY OF THE INVENTION

An aspect of the present invention provides a method of manufacturing a ceramic powder having excellent crystallinity and a perovskite structure with a small average particle diameter, and a ceramic powder having a perovskite structure manufactured by the foregoing method.

According to an aspect of the present invention, there is provided a method of manufacturing a ceramic powder having an $ABO_3$ perovskite structure, the method including: mixing a compound of an element corresponding to site A of the structure as well as a compound of an element corresponding to site B of the structure with supercritical water in a continuous mode to form seed crystals; and mixing the seed crystals in a batch mode to conduct grain growth thereof.

The forming of the seed crystals may be conducted for 5 seconds to 10 minutes.

The forming of the seed crystals may be conducted at a temperature ranging from 300 to 500° C. and in an atmosphere ranging from 50 to 300 atms.

The forming of the seed crystals may be conducted such that an average particle diameter of each crystal ranges from 3 to 20 nm and a crystal axis ratio (c/a) ranges from 1.001 to 1.004.

The grain growth may be conducted at a temperature ranging from 150 to 300° C.

The grain growth may be conducted for 2 to 100 hours.

The ceramic powder obtained after the grain growth may have an average particle diameter ranging from 50 to 150 nm and a crystal axis ratio (c/a) ranging from 1.005 to 1.010.

The compound of the element corresponding to site A may be an aqueous material having a salt contained therein.

The compound of the element corresponding to site B may be an aqueous material having a salt contained therein.

The compound of the element corresponding to site B may be a sol type material.

The element corresponding to site A may be at least one selected from a group consisting of Mg, Ca, Sr, Ba and La.

The element corresponding to site B may be at least one selected from a group consisting of Ti and Zr.

According to another aspect of the present invention, there is provided a ceramic powder having an $ABO_3$ perovskite structure, the ceramic powder manufactured by: mixing a compound of an element corresponding to site A of the structure as well as a compound of an element corresponding to site B of the structure with supercritical water in a continuous mode to form seed crystals; and mixing the seed crystals in a batch mode to conduct grain growth thereof.

The seed crystals may have an average particle diameter ranging from 3 to 20 nm and a crystal axis ratio (c/a) ranging from 1.001 to 1.004.

The ceramic powder obtained after the grain growth may have an average particle diameter ranging from 50 to 150 nm and a crystal axis ratio (c/a) ranging from 1.005 to 1.010.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
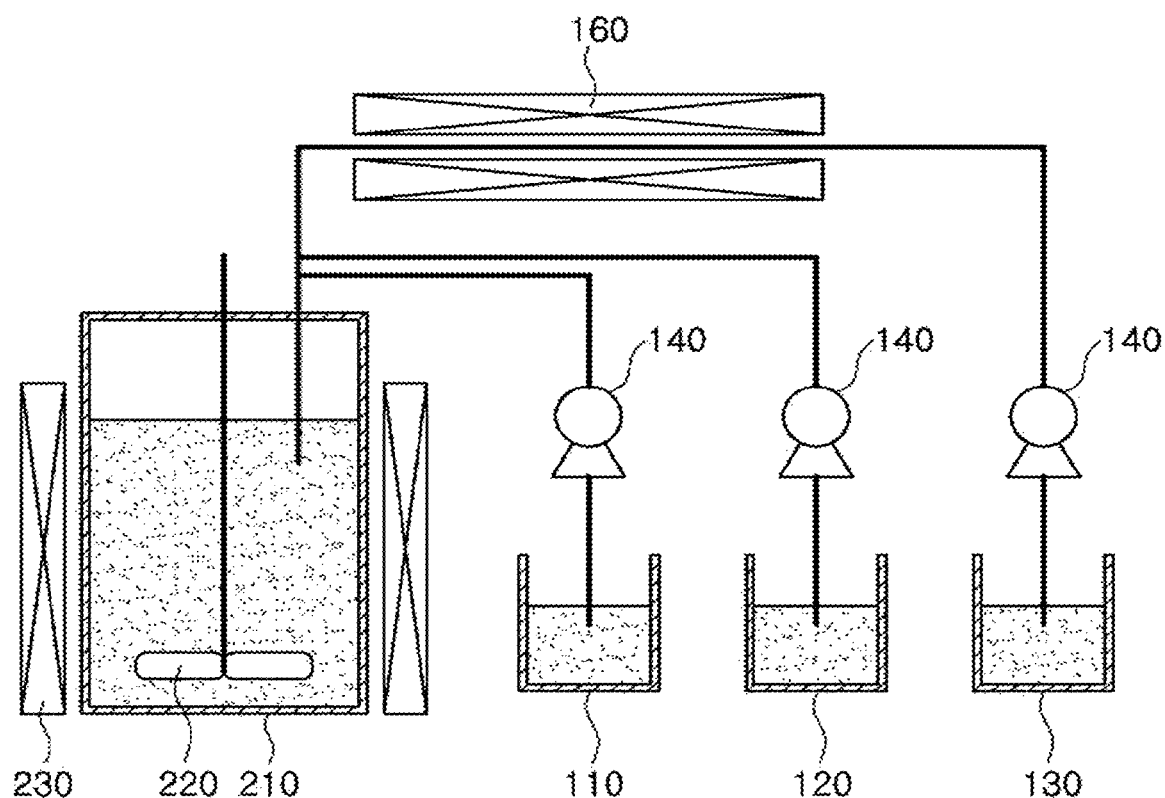
FIG. 1 schematically illustrates the constitution of a manufacturing apparatus usable for the production of a ceramic powder having an $ABO_3$ perovskite structure according to an exemplary embodiment of the present invention.

The present invention provides a method of manufacturing a ceramic powder having an $ABO_3$ perovskite structure and a ceramic powder having a perovskite structure manufactured by the foregoing method.

According to a method of manufacturing a ceramic powder having an $ABO_3$ perovskite structure according to an embodiment of the present invention, seed crystals are formed by a continuous reaction using supercritical water and such seed crystals may be subjected to grain growth in a batch type reaction. The ceramic powder having an $ABO_3$ perovskite structure according to the foregoing method may have a reduced average particle diameter and excellent crystallinity.

Hereinafter, a method of manufacturing a ceramic powder having an $ABO_3$ perovskite structure according to an exemplary embodiment of the present invention will be described in detail with reference to the accompanying drawings. Characteristics of a ceramic powder having an $ABO_3$ perovskite structure according to an exemplary embodiment of the present invention by the manufacturing method of the ceramic powder having an $ABO_3$ perovskite structure described below may be more clearly understood.

Hereinafter, exemplary embodiments of the present invention will be provided to allow those skilled in the art to which the present invention pertains to more clearly understand the present invention. Therefore, the shapes and/or sizes of respective elements shown in the accompanying drawings may be enlarged for clarity, and like reference numerals denote elements having substantially the same configurations or performing similar functions and actions throughout the drawings. Also, a variety of modifications, variations and/or alterations of the exemplary embodiments of the present invention may be possible and the present invention is not particularly restricted to the following embodiments.

FIG. 1 schematically shows a construction of a manufacturing apparatus useable for the production of a ceramic powder having an $ABO_3$ perovskite structure according to an exemplary embodiment of the present invention.

According to an embodiment of the present invention, a raw material used for the formation of a ceramic powder having an $ABO_3$ perovskite structure may be supplied from respective raw feeders 110, 120 and 130.

In the $ABO_3$ perovskite structure, a compound of an element corresponding to site A (the A-site) (hereinafter, optionally referred to as an A element raw material) may be received in a first raw material feeder 110 and delivered into a reaction pipe through a pump 140 connected to the first raw material feeder 110.

The element corresponding to A-site (hereinafter, optionally referred to as 'A element') may be an alkali-earth metal or rare-metal element. Without particular limitation, more particularly, the A element may be, for example, Mg, Ca, Sr, Ba, La, or the like, and two or more elements may be used.

The A element raw material may be a salt type material including the A element. More particularly, if A element is Ba, an aqueous salt such as barium acetate, barium chloride, barium hydroxide, or the like may be used. The salt type material may be received in the first raw material feeder in an aqueous solution state. Except for barium hydroxide, barium acetate or barium chloride may be used after neutralization using an alkaline solution. The alkaline solution may be LiOH, NaOH, KOH, $NH_4OH$, $Ba(OH)_2$, or the like.

The A element raw material may have a concentration ranging from 0.1 to 2M, without being particularly limited thereto.

In the $ABO_3$ perovskite structure, a compound of an element corresponding to site B (the B-site) (hereinafter, optionally referred to as 'a B element raw material') may be received in a second raw material feeder 120 and delivered into a reaction pipe through the pump 140 connected to the second raw material feeder 120.

The element corresponding to the B-site (hereinafter, optionally referred to as 'B element') may be a transition metal, for example, Ti, Zr, or the like, without being particularly limited thereto, and two or more elements may be used.

The B element raw material may be a salt type material including the B element. Without being particularly limited, if the B element is Ti, for example, a titanium salt such as titanium tetrachloride ($TiCl_4$) may be used. Alternatively, if the B element is Zr, a zirconium salt such as zirconium oxychloride ($ZrOCl_2$) may be used. The salt type material may be received in the second raw material feeder in an aqueous solution state. The B element raw material may have a concentration ranging from 0.05 to 2M, without being particularly limited thereto.

Alternatively, the B element raw material may be a sol type material including the B element. Without being particularly limited, for example, a titanium dioxide sol, a zirconium oxalate sol, or the like may be used. When the B element is a sol type, reactivity may be enhanced to thereby enable the production of a ceramic powder having excellent crystallinity.

A third raw material feeder 130 may receive distilled water, and the distilled water may be delivered to the reaction pipe through the pump 140 connected to the third raw material feeder 130. The distilled water supplied to the reaction pipe may be heated by a first heater 160 to form supercritical water.

The A element raw material and the B element raw material delivered from the first and second raw material feeders 110 and 120, respectively, may come into contact with the supercritical water in the reaction pipe and be mixed in a continuous mode. 'Mixed in a continuous mode' may be understood as being a process of mixing these materials while they flow through the reaction pipe. Hereinafter, a process of mixing the A element raw material and the B element raw material with the supercritical water in a continuous mode may be referred to as a continuous reaction.

When the A element raw material and the B element raw material are continuously mixed with the supercritical water, seed crystals are formed.

The A element raw material and the B element raw material may be simultaneously mixed with the supercritical water. The A element raw material and the B element raw material may react at room temperature and, in this case, seed crystals formed at room temperature may be a factor in preventing further grain growth. Accordingly, the A element raw material and the B element raw material may be mixed together immediately before reacting them with the supercritical water.

Under the supercritical water condition, the solubility of the salt is rapidly reduced, which in turn causes rapid precipitation of the A and B elements from the A and B element raw materials, respectively, and considerably increases the potential (or a tendency) to become a ceramic powder having an $ABO_3$ perovskite structure. Therefore, the seed crystals of the ceramic powder having an $ABO_3$ perovskite structure are rapidly formed, enabling the formation of seed crystals having high crystallinity.

When the supercritical water passes a subcritical region while being elevated in temperature, seed crystals may be formed in the subcritical region and subjected to grain growth. In this case, advantageous features of the supercritical water, that is, a reduction of defects by the rapid formation of seed crystals, a synthesis of super-microparticles, or the like, may not be embodied therein. Therefore, the A element raw material and the B element raw material may be mixed with the supercritical water in a supercritical region.

The foregoing continuous reaction is conducted while flowing the raw materials through the reaction pipe, and a reaction time is relatively short and may range from several to several tens of seconds. The reaction time may be varied depending on a length of the reaction pipe and/or a flow rate of the raw material. Without being particularly limited, the reaction time of the continuous reaction may range from 5 seconds to 10 minutes.

A temperature of the continuous reaction may be a supercritical temperature, for example, in the range of 300 to 500° C. Also, the continuous reaction may be conducted in an atmosphere ranging from 50 to 300 atms.

Seed crystals formed by the continuous reaction may have an average particle diameter ranging from 3 to 20 nm. Since the seed crystals are rapidly formed under supercritical conditions, OH defects in the seed crystals may be decreased while crystallinity is increased. A crystal axis ratio (c/a) of the seed crystals may range from 1.001 to 1.004.

The seed crystals formed by the continuous reaction may be introduced into a batch type reactor 210 through the reaction pipe. The batch type reactor 210 may have an impeller 220 mounted therein. In the batch type reactor 210, the seed crystals may be agitated for a long time and may be grown to a predetermined particle size by grain growth. Hereinafter, a process of mixing the seed crystals in the batch type reactor for a predetermined period of time may be referred to as a batch type reaction.

With regard to a construction in which a reactive solution flows along to a reaction pipe according to a continuous reaction, it is difficult to ensure sufficient time for grain growth. Therefore, according to an embodiment of the present invention, a reactant obtained from a continuous reaction is introduced into a batch type reactor and the grain growth of the reactant is conducted for a predetermined time in the batch type reactor.

The batch type reactor 210 may have a second heater 230 mounted thereon and a temperature of the batch type reactor may be controlled by the second heater 230.

The batch type reaction may be conducted at a temperature ranging from 150 to 300° C.

The batch type reaction may be conducted for several hours in order to reach a predetermined particle size. Without being particularly limited, a reaction time of the batch type reaction may range from 2 to 100 hours, for example.

As described above, after completing the grain growth of the seed crystals, a ceramic powder having an $ABO_3$ perovskite structure may be obtained. The obtained ceramic powder having the $ABO_3$ perovskite structure may have an average particle diameter ranging from 50 to 150 nm. By regulating the reaction time and/or the reaction temperature of the batch type reaction, an average particle diameter of a final powder may be controlled.

According to the foregoing embodiment of the present invention, a final powder may be formed by conducting the grain growth of seed crystals having excellent crystallinity, therefore, a ceramic powder having high crystallinity may be manufactured without limitation on particle size. Without being particularly limited, for example, a crystal axis ratio (c/a) of the final powder may range from 1.005 to 1.010. More preferably, a crystal axis ratio (c/a) of the final powder ranges from 1.0075 to 1.010.

After completing the batch type reaction, a precipitate solution is subjected to filtration, followed by washing and drying, thereby resulting in a ceramic powder having a perovskite structure.

In general, when a ceramic powder having a perovskite structure becomes microfine particles, the crystallinity thereof is decreased. However, according to an embodiment of the present invention, a ceramic powder having a perovskite structure with excellent crystallinity may be obtained while becoming microfine particles.

The ceramic powder according to an embodiment of the present invention is manufactured by forming seed crystals through a continuous reaction then conducting grain growth of the formed seed crystals through a batch type reaction. Each of the seed crystals may have an average particle diameter ranging form 3 to 20 nm and a crystal axis ratio (c/a) ranging from 1.001 to 1.004. An average particle diameter of a final powder obtained after the grain growth through the batch type reaction may range from 50 to 150 nm and a crystal axis ratio (c/a) thereof may range from 1.005 to 1.010.

The types or kinds of the ceramic powder having the $ABO_3$ perovskite structure according to an embodiment of the present invention may be varied, depending on the A element raw material and the B element raw material, without particular limitation. For example, the ceramic powder may be $BaTiO_3$, $(BaCa)TiO_3$, $(BaCa)(TiZr)O_3$, $Ba(TiZr)O_3$, $CaTiO_3$, $Ca(TiZr)O_3$, or the like.

The ceramic powder having the $ABO_3$ perovskite structure manufactured by an embodiment of the present invention may be used as a dielectric layer of an MLCC. Since the ceramic powder having the $ABO_3$ perovskite structure according to the embodiment of the present invention has a small average particle diameter and exhibits excellent crystallinity, the ceramic powder may form a thin dielectric layer. Accordingly, the surface roughness of the dielectric layer is decreased, thereby reducing short occurrence while enhancing electrical properties such as insulation resistance, or the like.

EXAMPLE

Hereinafter, preferred embodiments of the present invention will be described in detail with reference to the following examples and comparative examples. However, these embodiments are proposed only to provide a more concrete understanding of the present invention, and the present invention is not particularly limited thereto.

Examples 1 and 2

After storing a barium hydroxide solution having a concentration of 0.1 M and a $TiO_2$ sol in respective feeders, these materials were introduced into a reaction pipe through a pump and mixed with supercritical water in the reaction pipe to form seed crystals. The above continuous reaction was conducted at 351° C. and 263 atms (Example 1) and at 400° C. and 232 atms (Example 2). Next, the formed seed crystals were reacted in a batch type reactor for 24 hours, thereby producing a final BaTiO$_3$ powder having a particle diameter of 80 nm.

Comparative Example

A barium hydroxide solution having a concentration of 0.1 M and a TiO$_2$ sol were mixed with distilled water at 95° C. and under 1 atm to form seed crystals. Next, the formed seed crystals were reacted in a batch type reactor for 24 hours, thereby producing a final BaTiO$_3$ powder having a particle diameter of 80 nm.

Characteristics of the seed crystals and the final BaTiO$_3$ powder grains according to the foregoing examples and comparative Example were measured and the measured results are shown in TABLE 1.

TABLE 1

| | | Example 1 | Example 2 | Comparative Example |
|---|---|---|---|---|
| Seed crystal | Specific surface area (m$^2$/g) | 34 | 34 | 28 |
| | I [111]/I [200]* | 0.937 | 1.024 | 0.880 |
| | Lattice constant (Å) | 4.011 | 4.0062 | 4.0327 |
| | c/a | 1.001 | 1.002 | 1.000 |
| Final powder | Specific surface area (m$^2$/g) | 12.3 | 12.2 | 12.1 |
| | c/a | 1.0080 | 1.0082 | 1.0073 |

*I [111]/I [200] denotes XRD diffraction pattern ratio

Referring to Table 1, it was found that the seed crystals according to Examples 1 and 2 were synthesized under supercritical conditions, thus having very high crystallinity, compared to a size of the crystal. It was also found that, when such seed crystals were grown to be a powder having a particle diameter of 80 nm by grain growth, the final powder grains also had high crystallinity. On the other hand, it was found that the seed crystals in Comparative Example had a relatively high lattice constant (that is, a strong bond in lattice), leading to reduced crystallinity.

Figure 2A:
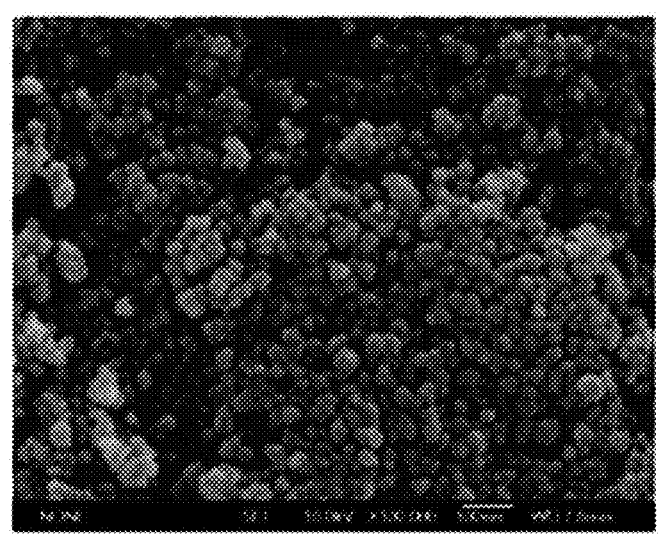
FIGS. 2A and 2B are scanning electron microscope (SEM) micrographs showing seed crystals according to Comparative Example and Example 2.
Figure 2B:
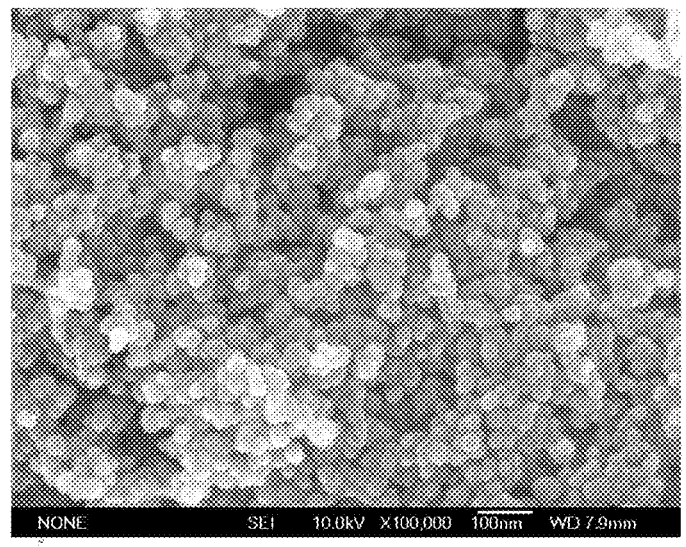
Figure 3A:
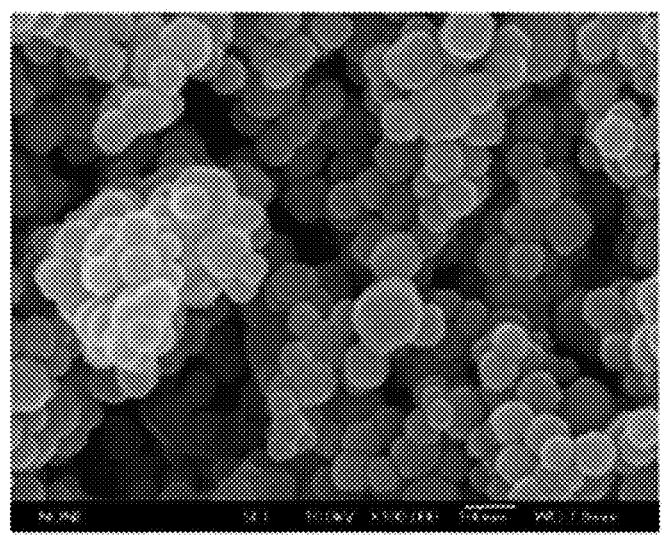
FIGS. 3A and 3B are SEM micrographs showing final powder grains according to Comparative Example and Example 2.
Figure 3B:
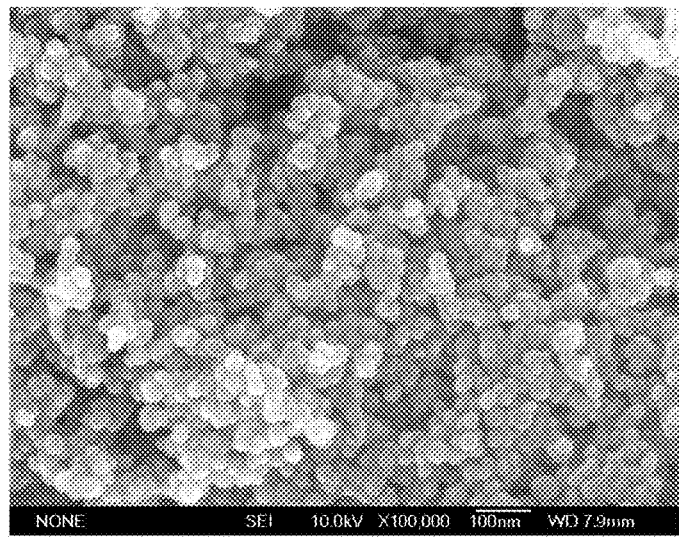

FIGS. 2A and 2B are SEM micrographs showing the seed crystals according to Comparative Example (FIG. 2A) and Example 2 (FIG. 2B), while FIGS. 3A and 3B are SEM micrographs showing the final powder grains according to Comparative Example (FIG. 3A) and Example 2 (FIG. 3B).

Figure 4A:
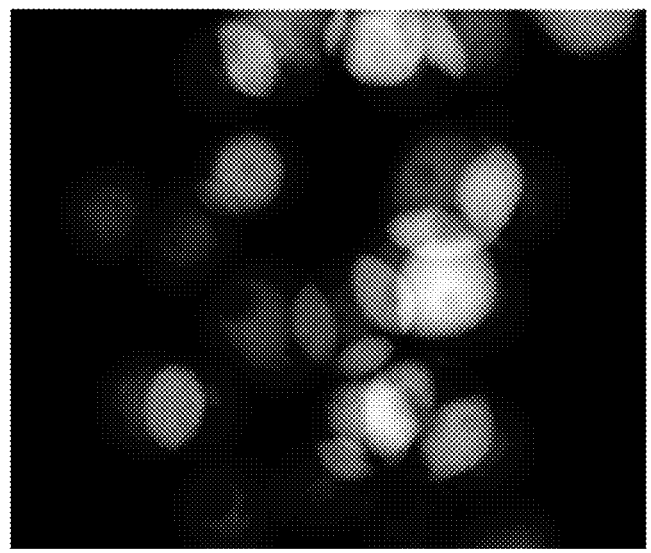
FIGS. 4A and 4B are scanning transmission electron microscope (STEM) micrographs showing final powder grains according to Comparative Example and Example 2.
Figure 4B:
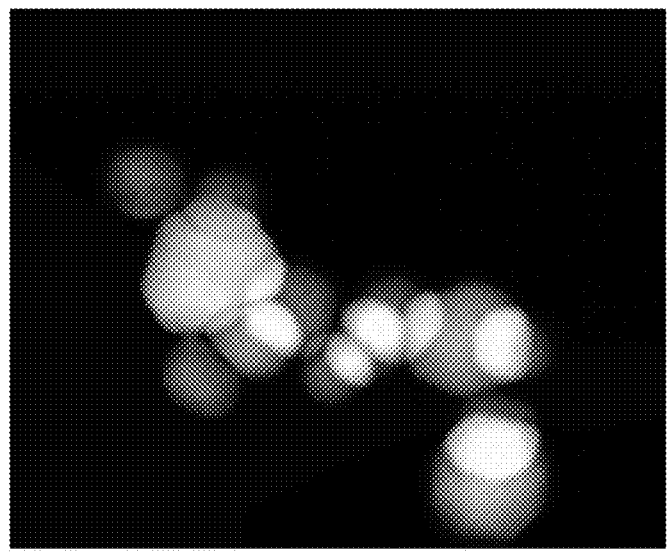

FIGS. 4A and 4B are STEM micrographs showing the final powder grains according to Comparative Example and Example 2, as described above.

Referring to FIG. 4A, the final powder according to the Comparative Example has a number of pores while FIG. 4B shows that the final powder according to Example 2 has no pores.

As set forth above, according to exemplary embodiments of the present invention, seed crystals may be formed under a supercritical water condition. Under such a supercritical water condition, a ceramic powder having an ABO$_3$ perovskite structure is rapidly formed into seed crystals, enabling the formation of seed crystals having high crystallinity. The seed crystals having high crystallinity may slowly undergo grain growth by a batch type reaction.

According to an embodiment of the present invention, seed crystals having excellent crystallinity are subjected to grain growth to produce a final power, to thereby manufacture a ceramic powder having high crystallinity without particular limitation in a particle size of the final powder.

When a ceramic powder having an ABO$_3$ perovskite structure manufactured by the method according to an embodiment of the present invention is used as a dielectric layer of an MLCC, the dielectric layer formed thereby may have reduced thickness and electrical properties of the MLCC may be enhanced.

The present invention is not particularly limited by the foregoing embodiments and the accompanying drawings, but defined by the appended claims. Accordingly, it will be apparent to those skilled in the art that various substitutions, modifications and variations can be made without departing from the spirit and scope of the invention as defined by the appended claims, and may be included in the scope of the present invention.

What is claimed is:

1. A method of manufacturing a ceramic powder having an ABO$_3$ perovskite structure, the method comprising:
   mixing a compound of an element corresponding to site A of the structure as well as a compound of an element corresponding to site B of the structure with supercritical water in a continuous mode to form seed crystals; and
   mixing the seed crystals in a batch mode to conduct grain growth thereof.

2. The method of claim 1, wherein the forming of the seed crystals is conducted for 5 seconds to 10 minutes.

3. The method of claim 1, wherein the forming of the seed crystals is conducted at a temperature ranging from 300 to 500° C. and in an atmosphere ranging from 50 to 300 atms.

4. The method of claim 1, wherein the forming of the seed crystals is conducted to have an average particle diameter ranging from 3 to 20 nm and a crystal axis ratio (c/a) ranging from 1.001 to 1.004.

5. The method of claim 1, wherein the grain growth is conducted at a temperature ranging from 150 to 300° C.

6. The method of claim 1, wherein the grain growth is conducted for 2 to 100 hours.

7. The method of claim 1, wherein the ceramic powder obtained after the grain growth has an average particle diameter ranging from 50 to 150 nm and a crystal axis ratio (c/a) ranging from 1.005 to 1.010.

8. The method of claim 1, wherein the compound of the element corresponding to site A is an aqueous material having a salt contained therein.

9. The method of claim 1, wherein the compound of the element corresponding to site B is an aqueous material having a salt contained therein.

10. The method of claim 1, wherein the compound of the element corresponding to site B is a sol material.

11. The method of claim 1, wherein the element corresponding to site A is at least one selected from the group consisting of Mg, Ca, Sr, Ba and La.

12. The method of claim 1, wherein the element corresponding to site B is at least one selected from the group consisting of Ti and Zr.

* * * * *